United States Patent [19]

LaFreniere

[11] Patent Number: 4,484,393

[45] Date of Patent: Nov. 27, 1984

[54] ILLUMINATED SPIRIT LEVEL

[76] Inventor: Dennis M. LaFreniere, 274 Talbot Ave., Winnipeg, Manitoba, Canada, R2L 0P8

[21] Appl. No.: 527,116

[22] Filed: Aug. 29, 1983

[51] Int. Cl.³ .............................................. G01C 9/06
[52] U.S. Cl. .................................... 33/348.2; 33/366; 33/384
[58] Field of Search ..................... 33/348.2, 366, 348, 33/365, 379, 377, 384

[56] References Cited

U.S. PATENT DOCUMENTS

| 2,993,281 | 7/1961 | Dock ..................................... 33/384 |
| 3,299,523 | 1/1967 | Lea ...................................... 33/366 |
| 4,154,000 | 5/1979 | Kramer ................................. 33/366 |

FOREIGN PATENT DOCUMENTS

| 737649 | 7/1966 | Canada ................................... 33/366 |
| 750088 | 12/1944 | Fed. Rep. of Germany ..... 33/348.2 |
| 1080534 | 6/1954 | France ................................ 33/348.2 |

Primary Examiner—Willis Little
Attorney, Agent, or Firm—Stanley G. Ade

[57] ABSTRACT

An illuminated spirit level comprises a bubble tube mounted in a support body with light source shielded to define two light paths directed through the bubble tube to apertures on the outside of the support body so that with the bubble positioned centrally the light is communicated directly from the light source through the bubble tube to the apertures. On movement of the bubble relative to the bubble tube caused by inclination of the spirit level, the bubble intercepts one of the light paths so as to cause refraction directing the light away from the aperture. The different refraction is caused by the difference in shape between the lower surfaces of the bubble and the upper surface of the bubble tube. The curvature of the bubble causes the edge to totally reflect the light path to divert the light.

4 Claims, 5 Drawing Figures

ILLUMINATED SPIRIT LEVEL

BACKGROUND OF THE INVENTION

This invention relates to an illuminated spirit level which can be used either as a simple level or as a leveling device in other equipment such as surveying equipment. Conventional spirit levels which are of simple and inexpensive construction comprise a support body which provides a surface to be placed on an object and a bubble tube provided within the body which is generally elongate and positioned with its longitudinal axis either along the length of the surface or transverse thereto so that a gas bubble within the liquid in the bubble tube can be positioned centrally of the bubble tube when the support surface is horizontal or vertical.

Spirit levels of this type are inexpensive and readily available and widely used. However they have a serious disadvantge in that it is very difficult or impossible to use the spirit level in low levels of illumination when the bubble cannot readily be seen.

Alternative forms of level indicating devices have been proposed to overcome this problem of illumination. Generally these solutions provide complicated electrical sensing of the position of a bubble or other floating object. These solutions have found little acceptance generally in the trade probably because they are expensive and complicated in comparison with the simple bubble tube arrangement which is fully satisfactory except in relation to this problem of illumination.

SUMMARY OF THE INVENTION

It is one object of the invention therefore to provide an illuminated spirit level which is of simple and inexpensive construction.

A further object of the invention is to provide an illuminated spirit level which is of robust construction with very little operative complexity thus forming a spirit level which is comparable in reliability to the simple bubble tube arrangement of the prior art.

It is a yet further object of the invention to provide an illuminated spirit level which is of very simple construction so that it can be manufactured and sold at a price comparable with the conventional bubble type spirit level.

According to the invention therefore there is provided an illuminated spirit level comprising a support body providing a surface for placing on an object, a bubble tube mounted in the support body and containing a liquid with a gas bubble in the liquid arranged to lie in a predetermined position in the tube when the surface lies in a desired inclination, a light source in the support body, screen means for dividing the light from the light source into two paths of light, a pair of apertures in the support body arranged such that with the bubble in the predetermined position each path of light passes through the bubble tube to a respective one of the apertures without intersecting the bubble, the bubble tube being arranged relative to the light source such that when the bubble moves from the predetermined position the bubble intersects and diverts one of the paths of light whereby the amount of light in said path passing through said aperture is reduced.

It is one advantage of the invention therefore that it contains effectively no moving parts with the only movement on change of inclination being provided by the bubble in the bubble tube.

It is a further advantage of the invention that the only added complexity relative to the conventional bubble tube type spirit level is the provision of a light source which can of course be very simple and therefore very reliable even in the adverse conditions where spirit levels are regularly used.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
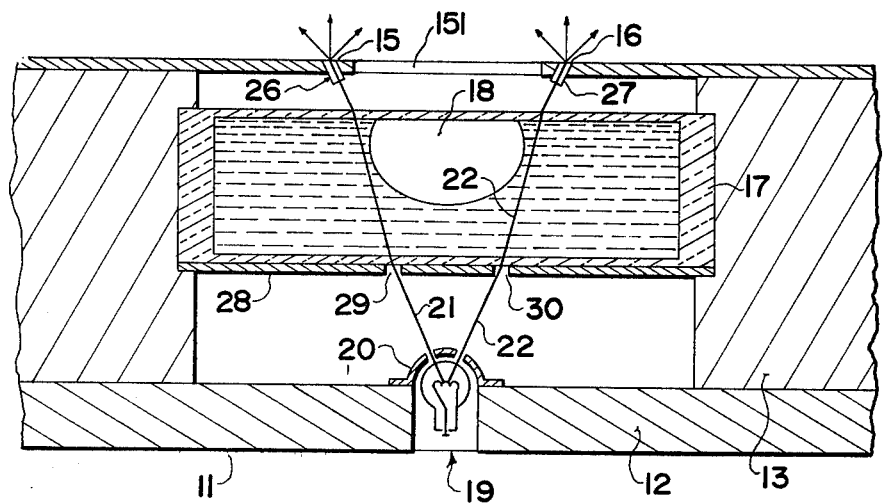
FIG. 1 is a cross sectional view along the lines 1—1 of FIG. 3 showing the spirit level in levelled position with the bubble central of the bubble tube.
Figure 2:
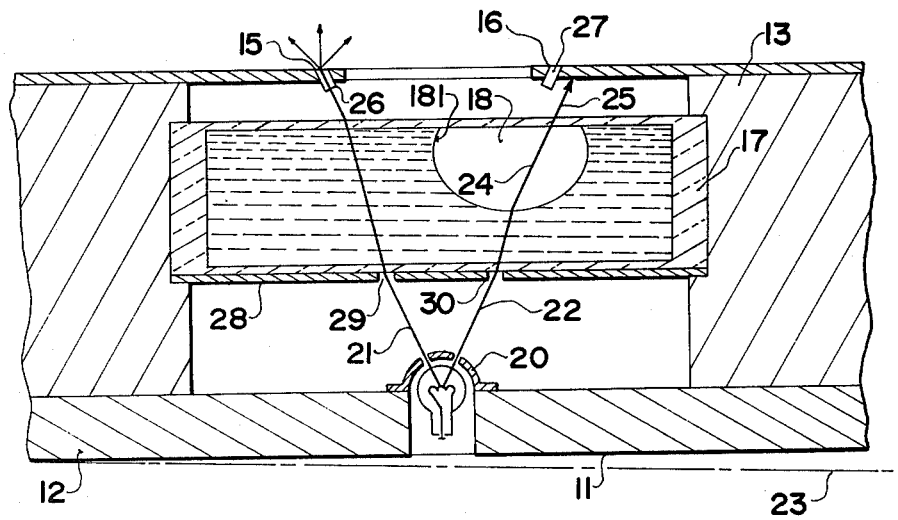
FIGS. 2 and 2A are the same view as FIG. 1 showing the spirit level in slightly inclined position so that the bubble is moved relative to the central position of FIG. 1.
Figure 3:
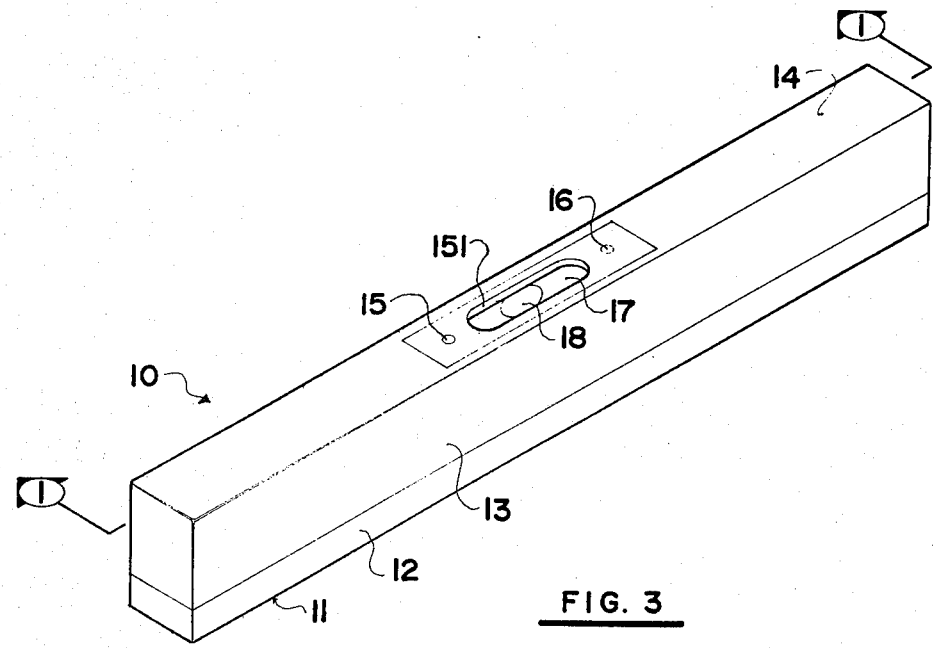
FIG. 3 is an isometric view of the exterior of the spirit level.

The spirit level shown in FIGS. 1, 2 and 3 comprises a rectangular elongate support body 10 which has a bottom surface 11 which can be placed upon the object whose level is to be checked. The support body is formed of base member 12 and a main body portion 13. The main body portion 13 is shrouded by a metal cover 14 to prevent interference from extraneous light. The cover 14 on the top of the spirit level has two small circular apertures 15, 16 defined therein at opposite ends of a central opening 151.

Within the body of the spirit level is mounted a bubble tube 17 which is of conventional construction and filled with a liquid leaving a small air bubble which as is well known settles in the bubble tube at a position defined by the inclination of the surface 11. The air bubble 18 in the horizontal positon shown in FIG. 1 rests in a central position of the bubble tube 17. In this position, the bubble can just be observed through the central opening 151.

A light source 19 is mounted in the portion 12 of the support body and is shrouded by a screen 20 which allows only two paths of light to escape, the paths being indicated at 21, 22 respectively. The paths travel firstly through a void provided within the portion 13 of the body and then encounter the bottom surface of the bubble tube and the liquid therein at which point they are refracted through an angle which can be calculated according to the well known theory on refraction so that the angle of the light relative to the direction normal to the surface of the bubble tube is reduced. The position of the light source relative to the bubble tube is arranged such that the refracted path of light passes through the circular apertures 15, 16 respectively with the angle of entry into the bubble tube being equal to the angle of exit.

In the example illustrated, the upper surface of the bubble tube and the lower surface of the bubble tube are straight but it will be apparent that alternative shapes of bubble tube can be used using the necessary modifications to the geometry of the light source and the apertures 15, 16.

As shown in FIG. 1, the arrangement of the geometry is such that the paths of light 21, 22 just pass immediately adjacent to either side of the bubble 18 when the bubble is in the central position with the surface 11 horizontal.

Turning now to FIG. 2, it will be noted that the surface 11 has been inclined relative to the horizontal indicated at 23. In this position the bubble 18 in fact remains stationary while the bubble tube 17 is tilted relative to the bubble. Thus the bubble effectively moves to one side relative to the bubble tube 17 so as to take up a position at the top of the liquid within the bubble tube with the lower surface of the bubble remaining curved. In this position the bubble 18 has moved relative to the path of light 22 so the edge of the bubble now intercepts the path. In view of the different inclination of the bottom of the bubble which is curved and the upper surface of the bubble tube which is inclined to the horizontal in view of the movement thereof, refraction occurs of the path of light 22 at the intersection between the bottom of the bubble and the liquid in the bubble to change the direction of the path of light as it emerges from the liquid in the bubble tube. This change of direction occurs at the point indicated at 24 and causes the path 22 to change to a path 25 which misses the apertures 16 and hence does not escape therethrough.

Figure 2A:
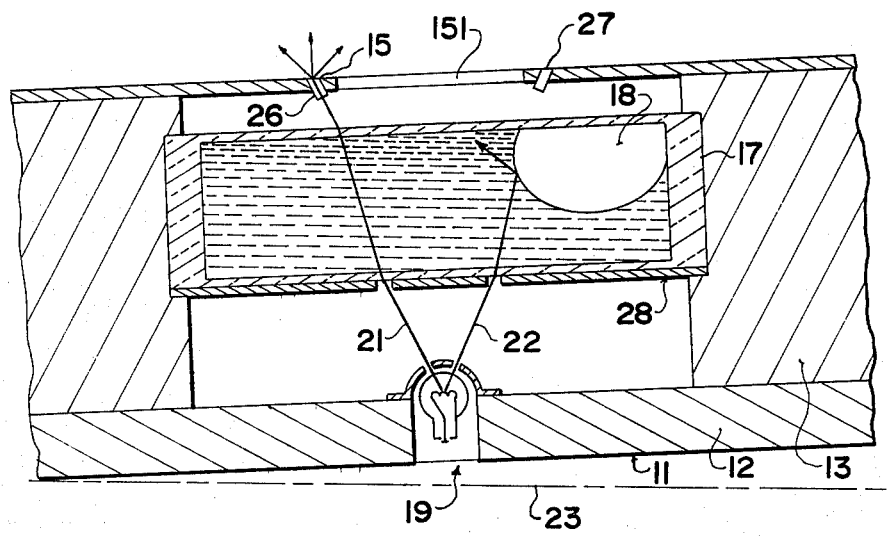

As shown in FIG. 2A, when either edge of the bubble, intersects the path of light, total reflection of the light can take place thus immediately and completely removing the light from the respective aperture 26, 27.

In some positions of the bubble it is possible for some light in the path to reach the aperture and in other positions all light in the path is directed away from the aperture. At least, therefore, the illumination of the aperture is reduced by the intersection of the bubble with the path.

In the position shown in FIG. 1 which is the horizontal position, therefore, light escapes from the light source through both the apertures 15 and 16 and can be observed by the user of the spirit level. The spirit level is therefore effectively self-illuminating and there is no problem in observing the horizontal inclination in any area whether poorly illuminated or in normal daylight. As soon as the inclination is changed from the horizontal for example as shown in FIGS. 2 or 2A, the edge of the bubble 18 engages or encounters one of the paths of light depending upon the direction of the inclination and thus acts to refract the engaged path of light so that it no longer passes through the respective aperture 15, 16 or the amount of light in the path passing through the aperture is reduced. Thus the inclination of the spirit level out of the horizontal position can be readily observed by the fact that only one of the apertures 15, 16 is illuminated or the illumination of one of the apertures is reduced with the direction of the inclination being indicated by that aperture 15, 16 which is not illuminated. The degree of inclination can be assessed by pivoting the spirit level away from the surface to see what angle is needed to pivot the spirit level back into the horizontal position as you would with present models.

The length of the bubble tube relative to the bubble is chosen such that the bubble comprises at least one third of the length whereby the bubble does not move to a position at one end of the tube where it no longer intercepts either path of light at without the tube being tilted through a large angle.

In order to make the light at the apertures 15, 16 visible to the eye positioned either directly above the apertures or at some other angle thereto, a piece of acrylic 26, 27 can be positioned in each of the apertures so as to diffuse the light directed towards the aperture. The piece of acrylic is spaced from the surface of the bubble tube and is sufficiently small so that when the path 25 misses the base of acrylic it does not illuminate the aperture 16.

The spirit level is very sensitive to small movements of the bubble because the meniscus of the bubble indicated at 181 provides severe changes of angle of the liquid/air intersection thus causing significant changes in the direction of the path of light. In certain circumstances total internal reflection can occur thus preventing any light from escaping in the direction of the respective aperture.

The bubble tube 17 can be mounted in the support body 13 by any suitable means for example cement and in one example the apertures 15, 16 can be formed as drilled slots in the cement which are dimensioned just to receive the path of light 21, 22 in its normal undiverted direction.

In an alternative arrangement (not shown) the lower surface of the bubble tube can be curved with the same radius of curvature as the upper surface with the light paths arranged to pass radially of the bubble tube whereupon it intersects both the upper and lower surfaces at right angles thereto whereupon no refraction normally takes place in the light path except when the bubble interferes with the light path as previously explained.

In order to assist in the prevention of extraneous light from interfering with the operation, a further shield or screen 28 may be positioned on the bottom of the bubble tube 17 with two slots 29, 30 which cooperate with the slots in the screen 20 to delineate the light path 21, 22.

Figure 4:
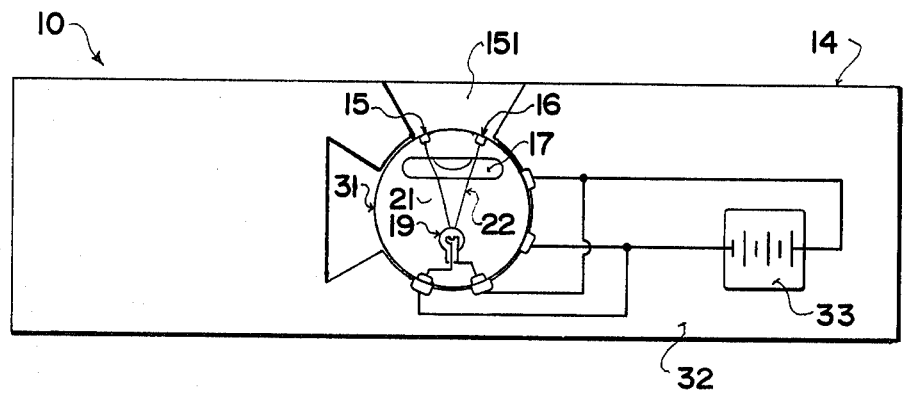
FIG. 4 is a side elevational view of a further embodiment of spirit level using the principles of FIGS. 1, 2 and 2A.

In FIG. 4, the bubble tube 17, light source 19 and dispersal apertures 15, 16 are built with a shallow cylindrical body or disc 31 with electrical contacts 32, 33 for electrical power to the light source. The disc 31 can be mounted in a bar 32 which supports a battery 33. The disc can be rotated within the bar 32 through 90° for rotation of the bubble tube for use as a vertical level. Contacts 34, 35 from the battery include two separate portions arranged at 90 for communicating power at the two orientations of the disc 31.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. An illuminated spirit level comprising an elongate support body providing a surface for placing on an object, a bubble tube mounted in the support body and containing a liquid with a gas bubble in the liquid arranged to lie in a predetermined position at an upper surface of the tube when the surface of the support body lies in a desired inclination, a light source in the support body and arranged beneath the tube so as to divide light onto a lower surface of the tube, first screen means adjacent the light source for dividing the light from said light source into two paths of light, second screen means adjacent the lower surface of said bubble tube to further delineate the two paths of light and direct the same through said tube, a first aperture in the support body through which the upper surface of the bubble tube can be observed for visual inspection of the position of the bubble, a pair of second apertures in the support body arranged one on each side of the first aperture and above the bubble tube such that with the bubble in the predetermined position each path of light passes through the bubble tube to a respective one of the second apertures without intersecting the bubble, each aperture including a translucent diffusion screen whereby the screen is illuminated by the light path, the bubble tube being arranged relative to the light source such that when the bubble moves from the predetermined position the bubble intersects and diverts one of the paths of light whereby the amount of light in said path passing through said aperture is reduced.

2. A spirit level according to claim 1 wherein the screen means is arranged such that with the bubble in the predetermined position, the paths of light pass the bubble immediately adjacent to respective ends thereof.

3. A spirit level according to claim 1 wherein the length of the bubble is at least one third that of the bubble tube.

4. A spirit level according to claim 1 wherein the bubble tube, light source and apertures are provided in a cylindrical body, and wherein the cylindrical body is mounted in the support body for limited rotation about the axis.

* * * * *